July 11, 1950        R. HAYWARD        2,514,492
BUBBLE LEVEL WITH CONICAL LENS
Filed Jan. 3, 1946
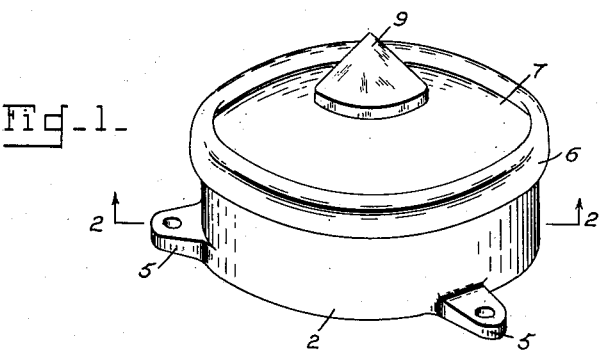
Fig-1-
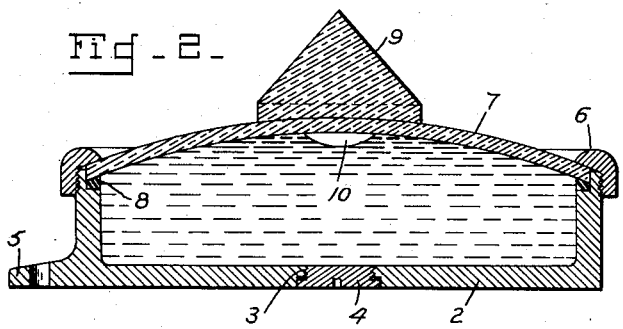
Fig-2-
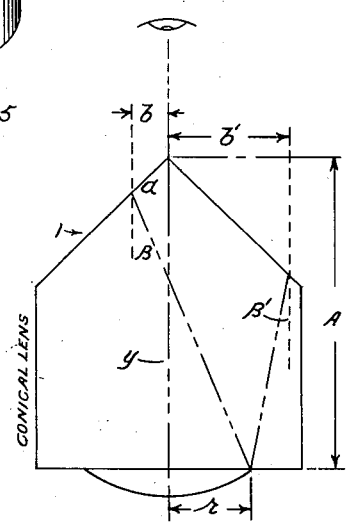
Fig-4-
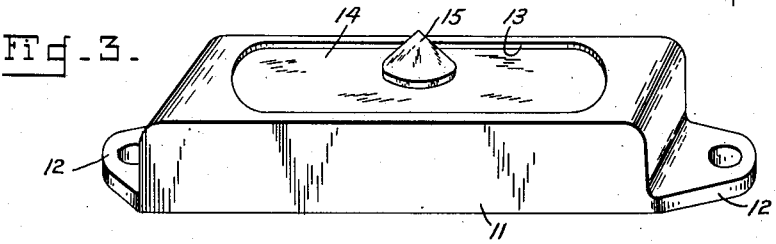
Fig-3-
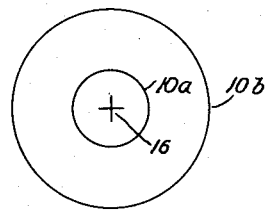
Fig-5-
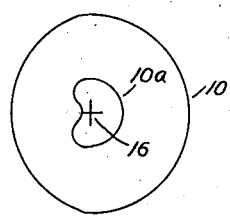
Fig-6-
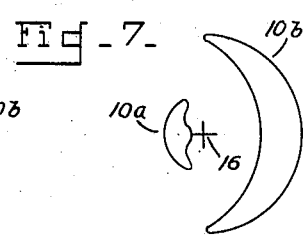
Fig-7-
Inventor
Roger Hayward
By J. H. Church & H. E. Thibodeau
Attorneys Patented July 11, 1950

2,514,492

UNITED STATES PATENT OFFICE 2,514,492

BUBBLE LEVEL WITH CONICAL LENS

Roger Hayward, Pasadena, Calif.

Application January 3, 1946, Serial No. 638,792

2 Claims. (Cl. 33—212)

This invention relates to means for facilitating the accurate reading of attitude indicating instruments such as bubble levels. It is known that with such instruments, sensitivity and rapid response are greater as the size of the indicating bubble increases. On the other hand, it is difficult to accurately center a large bubble with respect to the fiducial lines of the instrument, because of the difficulty in estimating the exact mid-point of the bubble.

With my invention, a large bubble may be used and its apparent size reduced by optical means hereinafter described. As thus constructed, I produce a level that is rapid in response, accurate and, at the same time, easy to read to a high degree of accuracy.

It is therefore one object of the invention to provide a bubble level that is highly accurate while being easy to read and rapid in response.

A further object is to provide a level in combination with optical reading means therefor, whereby a relatively large bubble may be made to appear of any desired reduced size without reducing the apparent displacement in the region of the fiducial lines.

A further object is to provide a level of the bubble or ball type wherein large and small images are formed, with the large image serving as a background for the small image, when the instrument is properly leveled and viewed.

Other objects and advantages will appear as the description proceeds.

In the drawings:

Figure 1 shows in perspective a circular bubble level embodying my invention,

Figure 2 is a cross section taken substantially upon the line 2—2, Fig. 1, and showing a suitable construction of casing, Figure 3 shows my invention as applied to a bubble tube level, Figure 4 is a diagrammatic view explaining the optical principle upon which the invention operates, Figure 5 is a view showing the appearance of the two images when the bubble is on the axis of the level and is viewed from a point upon said axis, Figure 6 is a view showing the general appearance of the two images with the bubble at a small displacement, and Figure 7 is a view showing the general appearance of the two images with the bubble displaced to a considerably greater degree than in Fig. 6.

Referring in detail to the drawing, and particularly to Fig. 4, the numeral 1 indicates in outline a conical lens having a total height A and an apex angle of $2\alpha$. The lens is shown superposed over a bubble of radius $r$. The eye may be assumed to be located at infinite distance along the principal or central axis $y$ of the lens, since, for qualitative explanation, the general relations of the images are not affected by change in position of the view point along said axis. In the figure, $b$ represents the radius of the smaller or inner image and $b^1$ the radius of the larger image. From the figure, it is clear that $$\tan \beta = \frac{r+b}{A-b \cot \alpha}$$

or $$b = (A - b \cot \alpha) \tan \beta - r = \frac{A \tan \beta - r}{1 + \cot \alpha \tan \beta}$$

similarly, $$b^1 = \frac{A \tan \beta' + r}{1 + \cot \alpha \tan \beta'}$$

As $r$ approaches zero, $b$ and $b^1$ approach equality at a value $$b'' = \frac{A \tan \beta}{1 + \cot \alpha \tan \beta}$$

wherein the resultant images appear as a thin annular line at the radius stated. As $r$ increases, $b$ decreases and thus can be made as small as desired. For example, using a cone of a plastic such as methyl methacrylate with a conical angle of 90°, a total height of about 2" and a bubble diameter of 1", the resulting diameter of the small inverted image will be about $\frac{3}{16}$".

Figures 1 and 2 show a circular type of bubble level provided with my invention wherein 2 is a cup-shaped casing having a filling opening 3, closed by a removable plug 4. Three apertured securing lugs 5 may be integral with the casing and are placed at 120° intervals thereabout so that the casing may be properly associated with its supporting surface, as by the use of shims or washers.

The top edge of the casing is threaded at the outside to receive a correspondingly threaded flanged retaining ring 6. At its inside edge, the said edge is shouldered to accommodate a crystal 7. A packing ring 8 is positioned between the shoulder and the crystal.

As shown, the crystal is formed as a section of the surface of a sphere and has centrally secured thereto, or formed integrally therewith a conical lens 9 having the desired characteristics, as explained in connection with Fig. 4. A body of liquid of any suitable and well-known type, fills the interior of the chamber thus formed, so as to leave a bubble 10. Fiducial lines such as 16, Fig. 5, are formed on the under side of the crystal.

Fig. 3 shows my invention as applied to a bubble tube level, wherein an elongated protective casing 11 has attaching lugs 12 and an aperture as at 13 and through which a bubble tube 14 may be viewed. This tube may be substantially cylindrical in shape and a conical lens 15 is formed integrally with, or secured to tube 14 to form a reduced image of the bubble, as previously explained.

Fig. 5 shows the appearance of the two images 10a and 10b, of a circular bubble 10, when centered with respect to fiducial lines 16 and when viewed from a point along axis $y$, Fig. 4. Fig. 6 shows the appearance of the two images when the instrument has been moved slightly out of a truly level position. Fig. 7 shows the distorted appearance of the two images when the instrument is still further moved from level position. It will be noted that, as the axis moves from a centralized position with respect to the bubble, that the outer image moves rapidly while the inner image also moves but distorts rapidly. The angle of tilt at which the images appear to separate when viewed along the axis, varies with the size of the bubble, that is, the value of $r$.

Any point on the periphery of the bubble may be seen in double image by the eye above the axis. For qualitative purposes the finite-distance position of the eye may be neglected. The general relations of the images are the same for different eye distances, the images appearing smaller as the eye approaches the lens. Thus, $b$ and $b'$, Figure 4, may represent the relative half-diameters of the outer and inner images. The outer image is simply an enlarged real image of the bubble while the inner image is reduced and inverted as may be deduced from Figure 4. In forming the inner minified image the lens inverts a polar coordinate system. The bubble is thus radially inverted, its center appearing outside or at the outer edge of the field and the edge of the bubble appearing at or near the center of the field and forming, invertedly, the outline of the small or minified image. Thus, when the eye and bubble are centered, the eye sees an enlarged or magnified image of the outline of the bubble with an apparent concentric hole in its center, of radius $b$, the hole being the minified reversed image.

For greater ease in reading it is preferable that the dimensions of the parts be so determined that the outer image will be so large as to form an apparent background or field for the smaller image.

If desired, sighting means may be added to aid in positioning the eye in and along the axis of the lens. For example, opaque spots might be placed along the axis of the lens so that when the eye is properly positioned, the spots will appear to merge into one.

While I have described a preferred form of instrument as it is now known to me, various alterations and modifications will be obvious to those skilled in the art and I desire to reserve all such changes and modifications as fall within the scope of the subjoined claims.

Having now fully disclosed by invention, what I claim as new, and desire to secure by Letters Patent, is:

1. In a level indicating instrument, a casing having a transparent top cover formed as a portion of the surface of a sphere, a liquid filling said casing except for an indicating element generally circular in contour therewithin, a conical lens secured on the exterior surface of said cover and having a principal axis vertical and intersecting said element centrally thereof when said instrument is in level position, said lens and element being so related and arranged that a minified image of said element is observable by an eye located on said principal axis above said lens when said instrument is in level position.

2. In a level-indicating instrument, a casing having a transparent outwardly-convex top, a body of liquid filling said casing except for a gas bubble, a conical lens secured to said top centrally thereof with its principal axis vertical and centrally intersecting said bubble when said instrument is in level-indicating position, said bubble and lens being constructed, proportioned and arranged so that a minified image of said bubble may be seen by an eye located on said axis above said top.

ROGER HAYWARD.

REFERENCES CITED

The following references are of record in the file of this patent:

UNITED STATES PATENTS

| Number | Name | Date |
|---|---|---|
| 534,303 | Traut | Feb. 19, 1895 |
| 612,577 | Smith | Oct. 18, 1898 |
| 666,843 | Brownell | Jan. 29, 1901 |
| 1,501,979 | Willson | July 22, 1924 |
| 1,537,909 | Wolter | May 12, 1925 |
| 1,731,284 | Andel et al. | Oct. 15, 1929 |
| 1,907,873 | Richards et al. | May 9, 1933 |
| 2,006,509 | Myers | July 2, 1935 |
| 2,059,033 | Rivier | Oct. 27, 1936 |
| 2,423,718 | Morrison | July 8, 1947 |

FOREIGN PATENTS

| Number | Country | Date |
|---|---|---|
| 456,272 | Great Britain | 1936 |